8266X
Sheet 1-3 Sheets.
Holbrook & French.
Loom.
Patented Jan. 17, 1834.
Plan.
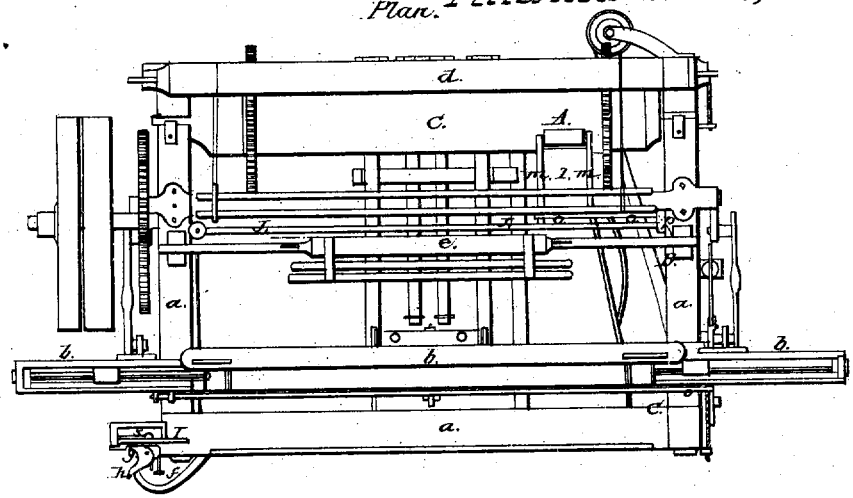
Side Elevation.
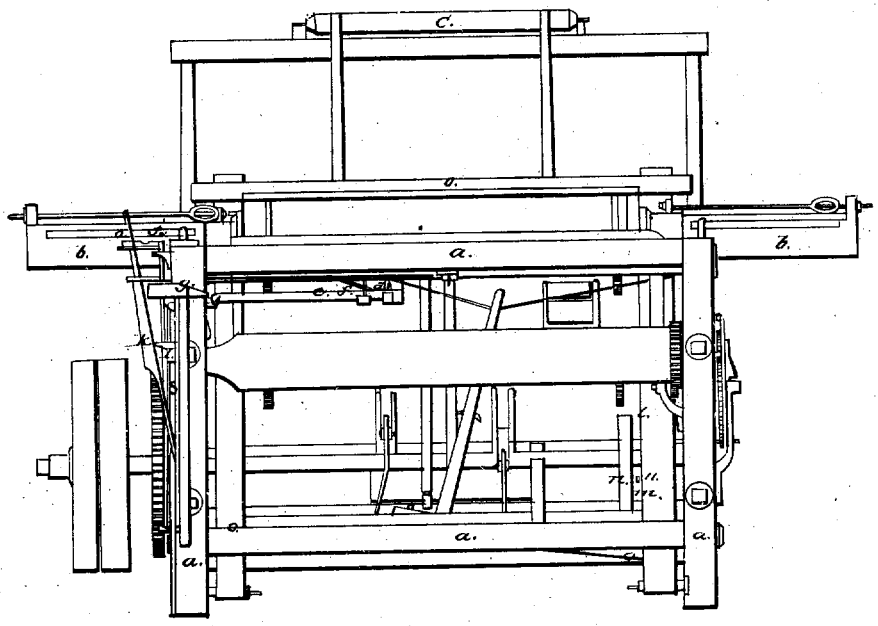
N. PETERS, PHOTO-LITHOGRAPHER, WASHINGTON, D. C.

8266X
Sheet 2-3 Sheets.
Holbrook & French.
Loom.
Patented Jan. 17, 1834.
Section 2nd
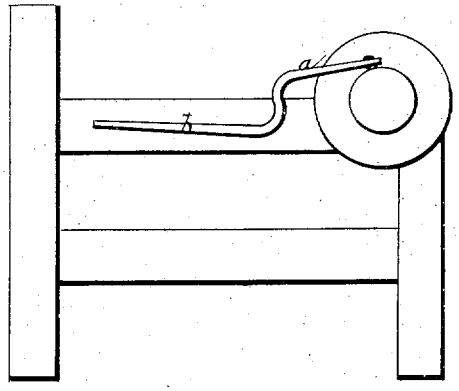
Fig. 2.
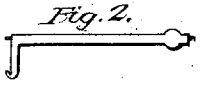
Lathe Elevation
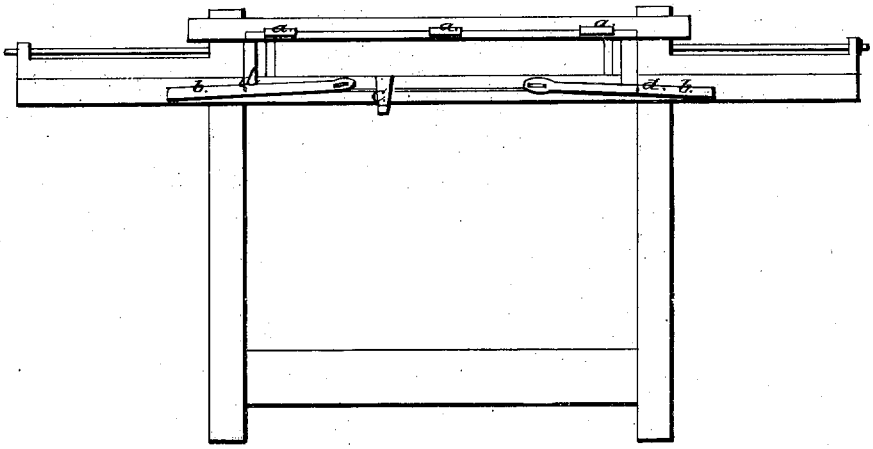
N. PETERS, PHOTO-LITHOGRAPHER, WASHINGTON, D. C.

8266X
Sheet 3-3 Sheets.
Holbrook & French.
Loom.
Patented Jun. 17, 1834.
End Elevation.
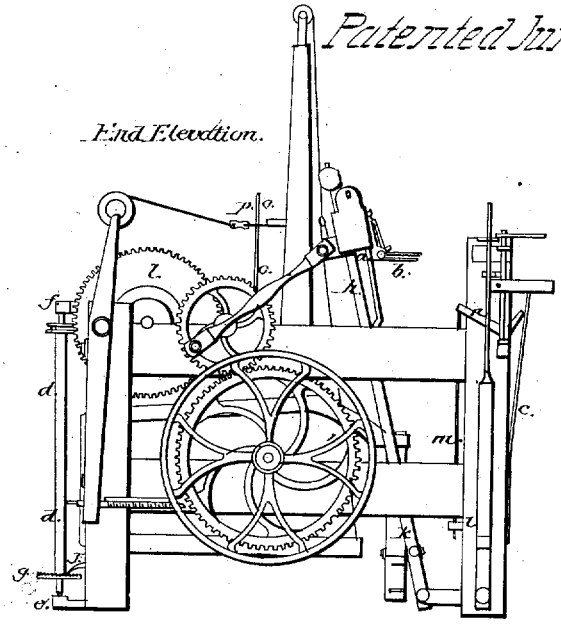
Section.
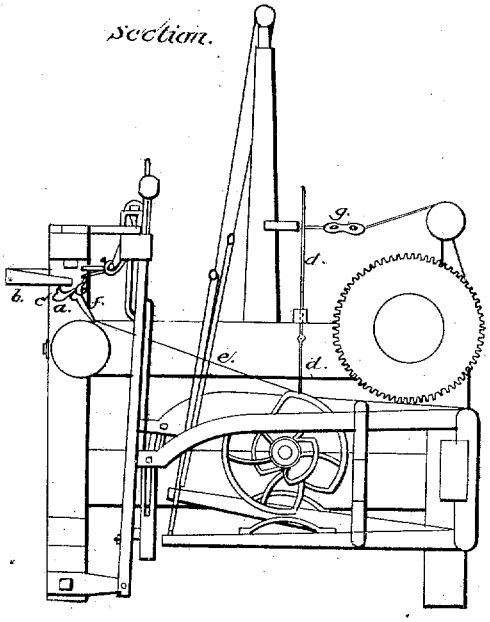
N. PETERS, PHOTO-LITHOGRAPHER, WASHINGTON, D. C.

Adin Holbrook & Benjamin F. French
Letters Patent

The Schedule referred to in these Letters Patent and making part of the same
containing a description in the words of the said Adin Holbrook & Benjamin
F. French themselves of their improvement in the Power Loom.

---

To all to Whom these Presents shall come Be it known that
we Adin Holbrook & Benjamin F. French both of Dunstable in the County
of Hillsborough and State of New Hampshire, have invented, made, construct-
ed and applied to use, the new and useful improvements hereafter mentioned
in the Power Loom, for weaving cloth, said improvements being three in number,
and that the following is a full and exact description of the construction and
operations of said improvements applicable to said loom as invented by us —
The power loom as heretofore known and used is not claimed by us, as an inven-
tion, but the first improvement claimed by us as an invention, is a stop motion
by means of which, the loom is stopped of itself, whenever the filling from any
cause is not thrown into the warp. The drawings attached to this specifica-
tion and herewith presented are to be considered part and parcel of the same.
The stop motion above mentioned is described as follows. A. A. A. on the plan
represents the frame of the loom, b, b, b. the loom lathe. C, the yarn beam, d,
the roll for the yarn to pass over, e, the roll for the harness to hang upon, be-
ing the same that is in common and ordinary use. The stop motion
is thus produced. A fly reed, so called, hanging upon hinges a, a, a, as rep-
resented in the lathe section, is fastened to the hand rail at the top and kept
in it at the bottom by springs b, b,. The reed having been heretofore known and
used is not claimed by us an invention. When the lathe is in motion for weav-
ing, and the filling is supplied from the shuttle, the force necessary to make
cloth will force the reed a little distance back from its natural place in the
lathe towards the harness if the springs are not too stiff. The springs are reg-
ulated by the screws b, b, seen in the lathe section, by which they are affixed to
the lathe and can be so altered as to let the reed spring to any distance re-
quired. Attached to the fly reed is the hammer c, seen in the lathe section,
and

82667 and also at a, on the end elevation. When the reed is forced back by the pressure of the cloth against it, in the regular motion for weaving, the hammer c. strikes the latch and crowds the end down, by means of a rise in the latch for the hammer to strike against, and the other end of the latch is thereby raised and carried safely over the protuberance d. This protuberance is made of steel with a square head and is screwed into the rolling shaft e, seen on the side elevation, and at fig. 2. shewing the shape of the shaft. f. is a spring to keep the rolling shaft in its place, with which it is connected by a strap. If the filling is not supplied from the shuttle, the let off motion herein after mentioned, passes the warp forward. When the cloth passes so far along towards the cloth beam, as not to offer sufficient resistance to force the fly reed out of its place in its motion forward — that is — not to overcome the resistance of the springs B, B. the hammer c. heretofore mentioned, does not raise the latch which is kept in its place by means of a spiral spring placed in front of the pin, which supports it. This spring has a tendency to keep the latch down at all times, unless it be raised by the hammer. By the motion of the lathe. the latch in this position strikes the protuberance, in the rolling shaft e, causing it to roll, whereby the arm a, seen on the section, falls a little from its natural position. The protuberence e, at the end of the arm. is thus thrown out, of the notch in the cam h, seen in section — seen also at f. on the plan, and also at g, on the side elevation. This cam is fastened to the shaft h, which stands on a pivot i, as seen on the side elevation, and is fastened to the spring C. seen on the side & end elevations by means of a leather strap passing around the hub of the cam, where the shaft passes through it. When the arm a, beforementioned drops and draws the protuberance out of the notch, the cam is put in a circular motion by means of the spring and the arm g. connected with the handle k, on the p[illegible] seen at j, on the side elevation, in its revolution, strikes against the small pin i, seen on the plan, and thus crowds the handle k, seen on the side elevation out of its notch, 3. seen on the plan, and the machinery commonly used for casting the loom belts, from the fast to the loose pulley takes effect and the loom is stopped in the ordinary way. Whenever the threads of the warp adhere closely together back of the lease rods, the rods are drawn out of their place towards the harness. by which means, defects are produced in the the cloth called drawn. In order to give notice to the weaver before any injury
results from this cause, another stop motion, has been invented by us, which is
the second improvement upon the said loom, claimed by us as an invention
and is described as follows, j.j. is a small iron rod, seen on the plan. Near
each end of the rod, are wires d. d, inserted through the rod at right angles,
seen on the section and at e, e, on the end elevation, one end arising above the
lese rods between them and the harness and the other projecting below the rod
j.j. At the lower end of one of the wires last mentioned, being that which is
inserted in the rod j. j, at the end next to the pulley which drives the loom
is a small wire e, extending to the elbow f, and connected with it as seen
on the section. The other end of this elbow rests upon the arm of the rolling shaft
e, seen in the side elevation already mentioned in the description of the other
stop motion. Whenever the yarn clings closely together, behind the lese
rods g, seen on the plan, the perpendicular wires are drawn towards the
harness. The lower end of the wire is drawn in the opposite direction
whereby the elbow is made to turn and the protuberance already men-
tioned in the end of the arm of the rolling shaft E. in the description already
given of the other stop motion, is drawn out of its notch in the cam and the
loom is stopped in the mode already pointed out. A let off motion where-
by equal quantities of warp, whenever cloth is made are unrolled from the
yarn beam in equal periods of time, is the third improvement upon
the said loom which is claimed by us as an invention. By means of
it cloth of an uniform thickness can be made it is described as follows.
d, d, seen on the end elevation is a small shaft which turns on a pivot
at e, and is held by the arm f, at the top. seen also at k, on the plan.
Attached to the bottom of this shaft, is a ratch wheel g, and also near the
top a spiral screw or worm h, which plays into the teeth on the beam
head i, seen on the end elevation, j, is a small iron hand extending
to the lathe k, k, and connected with it, and falls upon the ratch
wheel. The motion of the lathe in weaving will turn the ratch wheel
equal distances at each beat, by which means nearly quantities of warp
will be unwound from the yarn beam in equal periods of time.
The yarn beam will be reduced in size as the yarn is unwound from it.
In In order then to have equal quantities of warp let off in equal times, it will be necessary to turn the beam head farther and farther as the yarn beam becomes gradually smaller. It will therefore be necessary to turn the ratch wheel farther in proportion, as the yarn beam becomes smaller. This is accomplished thus, l, seen on the plan, is a piece of wood with two pieces of iron m, m, screwed to it tight, so as to form a stiff frame. The frame rests upon an arm o, o, fastened into the stand p, a, is a small iron roll that rests upon the yarn beam as rises or lowers the frame as the yarn beam varies in size. This frame as seen at h, on section 2nd shewing the shape of the irons and the position it lies in. At the bottom of this frame is an arm b, extending to the lathe. This arm b is in two pieces, but connected by a loose joint at c, on the pin so that the frame containing the roll may be turned up towards the harness far enough to put in and take out beams. The arm b, thus connected extends to the lathe. From the end of the arm next the lathe, is a small wire l, seen on the side elevation extending down the lathe and connected with the slide m, which slides in grooves made in two pieces of wood and fastened to the lathe seen on the side elevation at n. The end of the hand j seen on the end elevation is fastened into the slide m. seen on the side elevation, and when the frame l, seen on the plan is lowered, the arm j seen on the section is raised and that being connected with the slide as before mentioned, the slide is raised and the end of the hand j, with it. By this means the hand is pushed farther, and the ratch wheel is turned farther and this being connected with the beam as already mentioned, the beam will turn farther, and it will turn off equal quantities of warp in equal times, when the filling is supplied from the bobbin. When the filling is not supplied, and the loom in consequence stops, the hand j, is taken off from the ratch wheel in the following manner. B.B. on the plan represents a lever of wood running cross wise of the loom from the ratch wheel to the lathe, hung in the middle upon a pin or stud. It is fastened to another lever of wood c, c, seen on the side elevation, by a loose tenon, so that it cannot bind at the corner of the loom marked e. in the plan. At the end r, seen on the side elevation is a small wire s, extending to the elbow t, seen also on the the end elevation at l, m, n, When the cam b, seen in the section is turned in its proper position for making cloth, the spring e. is brought up towards the loom and it crowds the elbow n, and lowers the lever l, seen at o, o, on the side elevation, and that lever being connected with the lever b, b, on the plan by a loose tenon as beforementioned, which falls with it, and the end over the ratch wheel rises. The hand j, on the end elevation plays through a hook which passes round the end of the lever and under the hand so that it is raised and depressed with the lever. Both of these levers are made heavy at the ends at e, seen on the plan, and the other ends are tight. When the cam b, is let loose, the spring straightens and that permits the end of the levers to fall. Thus the hand is raised. This prevents the yarn from being unwound from the beam by any motion of the lathe unless the cam is brought to its proper place. The following is a list of what is claimed by us as our inventions and improvements described and set out in this specification, viz.

1 We claim to have invented or discovered the mode of applying the flyreed to the purposes herein specified, but as already stated we do not claim to have invented the flyreed itself. 2 We also claim to have invented the hammer e. and the latch b, and the rolling shaft c, and the cam g. b, and the spring f. connected with it by a strap, and the iron j, on the top of the shaft. 3 We also claim to have invented the rod j, j, with the perpendicular wires d, d, together with the wire extending to the elbow f, and the elbow itself. 4 We also claim to have invented the mode of attaching the hand j, to the slide m, in the lathe, also the slide and the frame l, and the roll A. lying upon the yarn beam, also the jointed arm e, extending towards the lathe, also the wire extending from the said arm to the said slide in the lathe connecting them together, also the wooden lever B, B, and the other wooden lever o, o, already mentioned for taking the hand j, out of the ratch wheel, also the small wire S, connected with the wooden lever o, o, and the elbow t, We claim the foregoing inventions and improvements for producing the effects already described in this specification however the proportions and size of the several articles claimed may be [illegible]

8266X increased, diminished or varied. We do not claim to have invent-
ed the power loom generally, nor the ratch wheel nor the loom screw
which plays into the beam head in the manner above specified.
In testimony whereof we have hereunto set our hands and seals this
fifth day of June A.D. 1834. in the presence of the witnesses who as such
have hereto subscribed their names Exd. Witnesses — Adin Holbrook
H.H. Dan'l Abbot — Benjamin F. French
Chas W Holbrook Drawing [2520 [illegible]